(12) United States Patent
Yoshizue et al.

(10) Patent No.: US 8,596,393 B2
(45) Date of Patent: Dec. 3, 2013

(54) DRIVE UNIT AND CONTROL APPARATUS THEREOF

(75) Inventors: Kensuke Yoshizue, Susono (JP);
Kazuya Arakawa, Fujinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 506 days.

(21) Appl. No.: 13/059,915

(22) PCT Filed: Aug. 20, 2009

(86) PCT No.: PCT/IB2009/006593
§ 371 (c)(1),
(2), (4) Date: Feb. 18, 2011

(87) PCT Pub. No.: WO2010/020864
PCT Pub. Date: Feb. 25, 2010

(65) Prior Publication Data
US 2011/0144848 A1 Jun. 16, 2011

(30) Foreign Application Priority Data
Aug. 21, 2008 (JP) .................................. 2008-213211

(51) Int. Cl.
*B60K 7/00* (2006.01)
(52) U.S. Cl.
USPC ............. 180/65.51; 280/451; 403/2; 464/32; 464/30; 417/319; 180/55; 180/65.6; 180/65.7

(58) Field of Classification Search
None
See application file for complete search history.

(56) References Cited

FOREIGN PATENT DOCUMENTS

| JP | 7 223453 | 8/1995 |
|---|---|---|
| JP | 7-298418 A | 11/1995 |
| JP | 2006 94574 | 4/2006 |
| JP | 2007 99106 | 4/2007 |
| JP | 2008 44436 | 2/2008 |
| JP | 2008 44439 | 2/2008 |
| WO | 03 065963 | 8/2003 |
| WO | 2005 023575 | 3/2005 |

OTHER PUBLICATIONS

International Search Report Issued May 26, 2010 in PCT/IB09/006593 filed Aug. 20, 2009.
English translation of the Office Action Issued Jun. 18, 2010 in Japanese Patent Application No. 2008-213211 filed Aug. 21, 2008.

*Primary Examiner* — Thomas Tarcza
*Assistant Examiner* — Richard Goldman
(74) *Attorney, Agent, or Firm* — Oblon, Spivak, McClelland, Maier & Neustadt, L.L.P.

(57) ABSTRACT

A drive unit is provided. The drive unit forms a power transmitting path that includes a driving shaft between a wheel/tire assembly and a driving power source provided separately for each wheel/tire assembly, and transmits power via the driving shaft. The drive unit has a weak portion, which is less durable than any other portion in the power transmitting path with respect to external force applied to the wheel/tire assembly, formed on the driving shaft.

17 Claims, 7 Drawing Sheets

DRIVE UNIT AND CONTROL APPARATUS THEREOF

BACKGROUND OF THE INVENTION

1. Field of the Invention

The invention relates to a drive unit which is provided for each driving wheel of a vehicle and can apply driving force or braking force by transmitting power directly to the driving wheel for which it is provided, as well as a control apparatus that controls that drive unit.

2. Description of the Related Art

Japanese Patent Application Publication No. 2007-99106 (JP-A-2007-99106) describes one example of a so-called in-wheel motor (IWM) drive unit that has been developed, in which a motor is arranged in or near a wheel of the wheel/tire assembly and is used M directly drive that wheel/tire assembly. The in-wheel motor drive unit described in JP-A-2007-99106 includes a motor, a planetary reduction gear, an output shaft, and a wheel rim. At least one bearing that rotatably supports a rotating element of the planetary reduction gear which is connected to the output shaft is arranged to the inside, in the vehicle width direction, of the center plane in the width direction of the wheel rim, and the output shaft is rotatably supported by this bearing. The motor, the planetary reduction gear, the output shaft, and the wheel rim are all connected together in that order so that power can be transmitted among them. Therefore, output torque of the motor can be transmitted from the motor to the wheel rim while being increased.

An in-wheel motor drive unit such as that described in JP-A-2007-99106 has a motor as a driving power source arranged in or near the wheel of the wheel/tire assembly, which transmits power directly to the wheel/tire assembly. This obviates the need to provide a power transmitting device such as a transmission or a differential in the vehicle, thereby enabling the structure of the vehicle to be simplified. On the other hand, because power is transmitted directly between the drive unit and the wheel/tire assembly, it is possible that an unexpectedly large external force may be directly transmitted from the wheel/tire assembly side to the drive unit at times such as when the vehicle is traveling on a rough road with potholes, bumps, or obstacles or the like, for example, which may damage the drive unit.

One conceivable way of dealing with unexpected excessive external force from the wheel/tire assembly side is to provide a greater safety margin and increase the strength of the various components that receive the external force such that even if such unexpected excessive external force is input to the drive unit from the wheel/tire assembly side, for example, it will not cause an abnormality in a driving shaft, gears or the motor in the drive unit. In this case, the various components are made larger or of stronger material than they are when they are designed without taking unexpected excessive force such as that described above into account. However, this may increase the size and weight, or manufacturing costs of the drive unit.

SUMMARY OF THE INVENTION

This invention thus provides a drive unit capable of inhibiting excessive force input from the wheel/tire assembly side from effecting the parts in the unit without increasing the size and weight or cost of the unit, as well as a control apparatus that controls that drive unit.

A first aspect of the invention relates to a drive unit. This drive unit forms a power transmitting path that includes a driving shaft between a wheel/tire assembly and a driving power source provided separately for each wheel/tire assembly, and which transmits power via the driving shaft. In this drive unit, a weak portion that is less durable than any other portion in the power transmitting path with respect to external force applied to the wheel/tire assembly is formed on the driving shaft.

With the drive unit according to the first aspect of the invention, the weak portion of the driving shaft in the power transmitting path between the wheel/tire assembly and the driving power source will break first when an unexpectedly large external force is applied to the wheel/tire assembly while the vehicle is traveling, for example. In other words, only the weak portion of the driving shaft will break so an excessive force from the wheel/tire assembly side will not be transmitted to the other portions of the power transmitting path. Therefore, the effects that excessive force input from the wheel/tire assembly side has on the other portions of the power transmitting path can be eliminated or minimized without increasing the size, weight, or cost of the unit.

In the drive unit described above, the weak portion may be made less durable by making the sectional area of the driving shaft smaller than the sectional area at any other portion of the driving shaft. That is, a portion of the driving shaft may be formed such that the sectional area along a plane perpendicular to the axial direction is smaller than the sectional area at other portion of the driving shaft.

With the drive unit described above, a weak portion that is weaker than any other portion against external force applied to the wheel/tire assembly can easily be formed on a portion of the driving shaft.

The weak portion may be made less durable by providing an oil passage through which oil flows.

With the drive unit described above, the portion where the oil passage is formed is a smaller sectional area than the other portions of the driving shaft by an amount corresponding to that oil passage. Therefore, a weak portion that is weaker than any other portion against external force applied to the wheel/tire assembly can easily be formed on a portion of the driving shaft.

The weak portion may be made less durable by making the material weaker than the material of any other portion of the driving shaft.

With the drive unit described above, the conditions under which heat treatment or surface treatment is performed on a portion of the driving shaft, or the methods themselves, may be different than they are at other portions of the driving shaft, for example. This enables the material at that portion of the driving shaft to be made weaker than the other portions of the driving shaft. As a result, a weak portion that is weaker than any other portion against external force applied to the wheel/tire assembly can easily be formed on a portion of the driving shaft.

A mechanism may be provided which generates force in opposite directions, which acts to move a portion of the driving shaft that is on the driving power source side of the weak portion and a portion of the driving shaft that is on the wheel/tire assembly side of the weak portion away from each another.

With this drive unit, if an unexpectedly large external force is applied to the wheel/tire assembly and, as a result, the weak portion of the driving shaft breaks, it is possible to prevent or inhibit the broken portions from interfering with on another.

The mechanism may include a gear drive mechanism that uses a helical gear which generates thrust in the opposite directions when power is transmitted between the driving shaft and the driving power source, and between the driving shaft and the wheel/tire assembly.

With this drive unit, a force can be generated in the driving shaft, which acts to separate the portion on the driving power source side of the weak portion formed on the driving shaft from the portion on the wheel/tire assembly side of the weak portion formed on the driving shaft. That is, the helical gear is a gear that generates thrust in the axial direction when power is transmitted. The torsional direction of the teeth of the helical gears is set such that thrust is generated in the direction that separates the portion on the driving power source side of the weak portion of the driving shaft from the portion on the wheel/tire assembly side of the weak portion of the driving shaft. Arranging the helical gear between the driving shaft and the driving power source, as well as between the driving shaft and the wheel/tire assembly makes it possible to easily generate force in the directions that separate the portion on the driving power source side of the weak portion of the driving shaft from the portion on the wheel/tire assembly side of the weak portion of the driving shaft.

The end portion on the driving power source side of the driving shaft may be formed in a cylindrical shape having an outer peripheral portion and an inner peripheral portion. Also, the gear drive mechanism may be provided on the outer peripheral portion, and a bearing that rotatably supports the driving shaft may be provided on the inner peripheral portion.

With this drive unit, the gear drive mechanism that transmits power to the driving shaft, and the bearing that supports one end of that driving shaft, are arranged in generally the same position in the axial direction of the end portion on the driving power source side of the driving shaft. Therefore, even if an unexpectedly large external force is applied to the wheel/tire assembly and, as a result, the weak portion of the driving shaft breaks, the portion on the driving power source side of the weak portion of the broken driving shaft can easily be supported by the bearing, thereby making it easier to maintain the rotational state or supported state of that broken portion.

At least a portion of the driving shaft may be hollow, and a rotating shaft of an oil pump may be inserted in the hollow portion of the driving shaft in such a manner that the rotating shaft is able to rotate together with the driving shaft.

With this drive unit, if an unexpectedly large external force is applied to the wheel/tire assembly and, as a result, the weak portion of the driving shaft breaks, for example, the broken driving shaft can be supported by the oil pump and the rotating shaft thereof, thereby enabling the rotational state or the supported state of that broken driving shaft to be maintained.

The rotating shaft may be engaged with a portion of the driving shaft that is on the driving power source side of the weak portion such that the rotating shaft is able to rotate together with that portion of the driving shaft.

With this drive unit, if an unexpectedly large external force is applied to the wheel/tire assembly and, as a result, the weak portion of the driving shaft breaks, for example, the portion on the driving power source side of the weak portion of the broken driving shaft can be supported by the oil pump and the rotating shaft thereof, thereby enabling the rotational state or the supported state of that broken portion to be maintained.

The rotating shaft may be inserted up to an inner peripheral portion of the driving shaft that is on the wheel/tire assembly side of the weak portion.

The outer peripheral surface of the rotating shaft may be surface treated to reduce the friction coefficient.

With this drive unit, if an unexpectedly large external force is applied to the wheel/tire assembly and, as a result, the weak portion of the driving shaft breaks, for example, the weak portion of the broken driving shaft can be supported by the oil pump and the rotating shaft thereof, thereby enabling the rotational state or the supported state of that broken driving shaft to be maintained.

The driving power source may be able to drive the oil pump when the driving shaft is broken at the weak portion.

With this drive unit, even if the weak portion of the driving shaft breaks, the oil pump can be driven so that oil can be appropriately supplied to the locations where it is needed.

The driving power source may include an in-wheel motor housed in a wheel of the wheel/tire assembly.

This drive unit makes it possible to eliminate or minimize the effects that excessive force from the wheel/tire assembly side has on the parts in the drive unit without increasing the size, weight, or cost of the unit. That is to say, a so-called failsafe function can be established against excessive force being input from the wheel/tire assembly side.

A second aspect of the invention relates to a control apparatus of a drive unit. This drive unit forms a power transmitting path that includes a driving shaft between a wheel/tire assembly and an electric motor provided separately for each wheel/tire assembly, and which transmits power via the driving shaft. In this drive unit, a weak portion that is less durable than any other portion in the power transmitting path with respect to external force applied to the wheel/tire assembly is formed on the driving shaft. The drive unit has an oil pump that can be driven by output torque from the electric motor when the driving shaft is broken at the weak portion. The control apparatus includes a sensor that detects an operating state of the drive unit, an abnormality detecting portion that detects an abnormality in various portions relating to the drive unit based on a detected value of the sensor, and an electric motor controlling portion that controls the electric motor based on the abnormality detected by the abnormality detecting portion.

With the drive unit to be controlled by the control apparatus described above, the weak portion of the driving shaft in the power transmitting path between the wheel/tire assembly and the driving power source will break first when an unexpectedly large external force is applied to the wheel/tire assembly while the vehicle is traveling, for example. In other words, only the weak portion of the driving shaft will break so the effects from external force on the other portions of the power transmitting path can be eliminated or minimized. Also, even if the weak portion of the driving shaft breaks in this way, the oil pump can still be driven. That is, the drive unit has a so-called failsafe function against excessive force being input from the wheel/tire assembly side.

With the drive unit having this failsafe function as the target of control, it is determined whether there is an abnormality in the drive unit from the detected values of various sensors. If an abnormality is detected, operation of the electric motor is appropriately controlled according to that abnormality. Therefore, when an unexpectedly large external force is applied to the wheel/tire assembly and, as a result, the weak portion of the driving shaft breaks such that oil needs to be supplied by the oil pump, the operation of the motor is controlled to appropriately control the driving state of the oil pump such that oil can be appropriately supplied to those places where it is needed. That is, a so-called failsafe function can be established against excessive force being input from the wheel/tire assembly side.

The sensor may include a wheel speed sensor that detects the rotation speed of the wheel/tire assembly and a rotation speed sensor that detects the rotation speed of the electric motor. Also, the abnormality detecting portion may include a first break determining portion which determines that the weak portion is broken when it is determined that there is no abnormality in the wheel speed sensor based, on a detected value of the wheel speed sensor, and the difference between the rotation speed of the wheel/tire assembly detected by the wheel speed sensor and the rotation speed of the electric motor detected by the rotation speed sensor of the electric motor provided for the wheel/tire assembly exceeds a threshold value that has been set as a determination reference.

With this drive unit, it is possible to easily and appropriately determine whether the weak portion of the driving shaft has broken based on the rotation speed of the wheel/tire assembly which is detected by the wheel speed sensor, and the rotation speed of the electric motor which is detected by the rotation speed sensor.

The sensor may also include a rotation angle sensor that detects the rotation angle of the electric motor. Also, the abnormality detecting portion may include a second break determining portion which determines that the weak portion is broken when it is determined that there is an abnormality in the wheel speed sensor based on a detected value of the wheel speed sensor, and the difference between the rotation angle of the wheel/tire assembly detected by the wheel speed sensor and the rotation angle of the electric motor detected by the rotation angle sensor of the electric motor provided for the wheel/tire assembly exceeds a threshold value that has been set as a determination reference.

With this drive unit, it is possible to easily and appropriately determine whether the weak portion of the driving shaft has broken based on the rotation speed of the wheel/tire assembly which is detected by the wheel speed sensor, and the rotation angle of the electric motor which is detected by the rotation angle sensor.

The sensor may also include a temperature sensor that detects the temperature of an oil receiving portion to which oil is supplied by the oil pump. Also, the electric motor controlling portion may include a pump driving portion which drives the oil pump by controlling the electric motor when it is determined by the abnormality detecting portion that the weak portion is broken, and the temperature detected by the temperature sensor exceeds a threshold value that has been set as a determination reference that requires oil be supplied to the oil receiving portion.

With this drive unit, it is possible to easily and appropriately determine the need to supply oil to the oil receiving portion based on the temperature of the portion to be supplied with oil, which is detected by the temperature sensor. If it is determined that oil needs to be supplied to the oil receiving portion, the operation of the electric motor is controlled to appropriately control the driving state of the oil pump so that oil can appropriately be supplied to the oil receiving portion. In other words, the electric motor is only driven to supply oil when oil needs to be supplied to the oil receiving portion, and is not driven when oil does not need to be supplied to the oil receiving portion.

The electric motor may include an in-wheel motor housed in a wheel of the wheel/tire assembly.

This control apparatus makes it possible to prevent or minimize the effects that excessive force input from the wheel/tire assembly side have on the various parts in a drive unit that has an in-wheel motor as a driving power source arranged in or near the wheel of the wheel/tire assembly, without increasing the size and weight or cost of that drive unit. That is, a so-called failsafe function can be established against excessive force input from the wheel/tire assembly side.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

The drive unit of the invention transmits output torque from a driving power source provided separately for each wheel/tire assembly to each wheel/tire assembly, and generates driving force or braking force in the wheel/tire assembly for which it is provided. One example of such a drive unit is a so-called in-wheel drive unit in which an electric motor (also simply referred to as "motor") is housed as a driving power source in a wheel of the wheel/tire assembly. The in-wheel motor is an electric motor that is supported by the vehicle body and directly drives the wheel. The in-wheel motor may drive the wheel by having an output shaft that is integrated with a rotor be directly connected to a wheel mount. Alternatively, a speed change mechanism may be interposed between the output shaft and the wheel, and the in-wheel motor may transmit torque that has been increased or decreased by the speed change mechanism to the wheel. This in-wheel motor is supported via an arm member, such as a knuckle arm at the steered wheels such as the front wheels, and an upper arm and a lower arm at the non-steered wheels such as the rear wheels.

Figure 1:
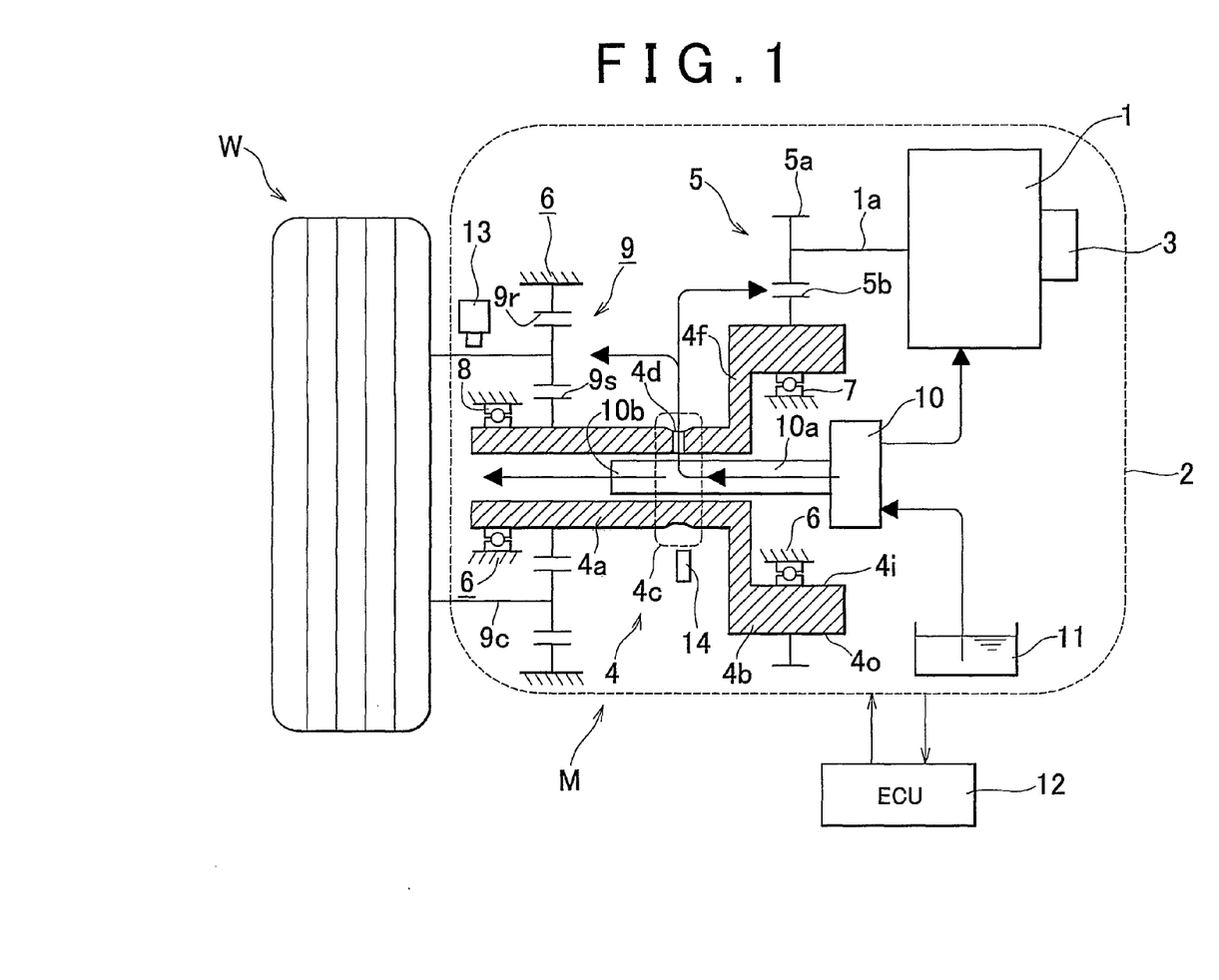
FIG. 1 is a schematic diagram showing a frame format of an example of a structure able to be applied to a drive unit according to an example embodiment of the invention.

FIG. 1 is a schematic diagram showing a frame format of an example of a drive unit of the invention. The example shown in FIG. 1 is an example of a structure in which a so-called in-wheel motor drive unit such as that described above is applied to a vehicle. In FIG. 1, the reference character W denotes a wheel/tire assembly of the vehicle, which includes a wheel, not shown, and a tire. An in-wheel motor unit M is arranged on the inner peripheral portion of the wheel/tire assembly W and on the same axis as the wheel/tire assembly W. That is, the in-wheel motor unit M is housed in the wheel of the wheel/tire assembly W.

This in-wheel motor unit M is mainly used to output driving torque for driving the vehicle. A motor 1 such as an induction motor or a synchronous motor is housed in a housing 2. That is, the motor 1 of this in-wheel motor unit M is an electric motor that serves as the driving power source of the drive unit of the invention. This motor 1 is provided in each wheel/tire assembly W and is capable of transmitting output torque to the wheel/tire assembly W in which it is provided. This in-wheel motor unit M is supported by the housing 2 being mounted to an arm member, not shown, which is connected to the body, not shown, of the vehicle.

A resolver 3 for detecting the rotation angle (i.e., the rotational position) of an output shaft (or a rotor shaft) 1a of the motor 1 is provided on the motor 1. This resolver 3 is able to detect the rotation angle of the output shaft 1a, as well as obtain the rotation speed of the output shaft 1a based on the detected value of that rotation angle. Therefore, the resolver 3 functions as a rotation angle sensor and a rotation speed sensor of the invention.

A driving shaft 4 is arranged parallel to the output shaft 1a of the motor 1. The output shaft 1a and the driving shaft 4 are capable of transmitting power via a pair of counter gears 5 which consist of a counter drive gear 5a and a counter driven gear 5b. That is, the counter drive gear 5a is integrally formed with the output shaft 1a on the tip end (i.e., the left end in FIG. 1) thereof and is in mesh with the counter driven gear 5b which is integrally formed on the end portion on the motor side (i.e., the right side in FIG. 1) of the driving shaft 4.

Here, the pair of counter gears 5 are helical gears that generate thrust in the axial direction when power is transmitted. The direction in which the teeth of the helical gears are slanted (i.e., the torsional direction) is set such that thrust is generated in the direction from the driving shaft 4 toward the motor 1 when power is transmitted between the output shaft 1a and the driving shaft 4. Therefore, when power is transmitted to the driving shaft 4, i.e., when the driving shaft 4 is rotated, force that acts to move the driving shaft 4 toward the motor 1 is applied to the end portion on the motor 1 side of the driving shaft 4. Therefore, if the driving shaft 4 breaks at an established weak point, that force will prevent the broken portions from interfering with each other, as will be described later.

The driving shaft 4 is a hollow shaft and is supported at both ends by bearings 7 and 8 that are fixed to a fixed portion 6 in the housing 2, for example. More specifically, the driving shaft 4 includes a main body portion 4a and a cylindrical portion 4b. The main body portion 4a is formed in a hollow circular column shape. The cylindrical portion 4b is formed integral with the main body portion 4a. The counter driven gear 5b is integrally formed on the outer peripheral portion of the cylindrical portion 4b, and one of the bearings, i.e., the bearing 7, is arranged on the inner peripheral portion of the cylindrical portion 4b. That is, the driving shaft 4 includes the hollow circular column-shaped main body portion 4a and the cylindrical portion 4b which has an outer peripheral portion 4o and an inner peripheral portion 4i. The main body portion 4a is integrally formed with the cylindrical portion 4b.

As described above, more specifically, the bearing 7 provided on the inner peripheral portion 4i of the cylindrical portion 4b that has the counter driven gear 5b formed on the outer peripheral portion 4o is arranged in the same or almost the same position as the counter driven gear 5b in the axial direction of the cylindrical portion 4b. That is, the counter driven gear 5b of the pair of counter gears 5 and the bearing 7 that supports one end of the driving shaft 4 are arranged in the same or almost the same position in the axial direction.

As a result, when a load is applied from the counter drive gear 5a to the counter driven gear 5b on the outer peripheral portion 4o, all or almost all of the reaction force of the component force in the radial direction (i.e., the vertical direction in FIG. 1) of that load can be received by the bearing 7. Therefore, a moment in the direction in which the driving shaft 4 slants or bends due to the load from the pair of counter gears 5 being received by the driving shaft 4 will not be generated. Accordingly, if the driving shaft 4 is broken midway along the main body portion 4a, for example, the portion of the broken driving shaft that is on the motor 1 side is supported like a cantilever by the bearing 7, thereby making it easier to keep the rotational state of that broken portion or the supported state of that broken portion stable.

In the example shown in FIG. 1, the driving shaft 4 in the invention is such that the portion on the wheel/tire assembly W side (i.e., the left side in FIG. 1) of the cylindrical portion 4b is integrally formed, via a flange portion 4f of that cylindrical portion 4b, with the portion on the motor 1 side of the main body portion 4a of the driving shaft 4. That is, as long as the cylindrical portion 4b has the outer peripheral portion 4o and the inner peripheral portion 4i and a rotating shaft 10a of an oil pump 10, which will be described later, is arranged inserted past the inner peripheral side of the inner peripheral portion 4i and into the hollow portion of the main body portion 4a, the outer shape of the main body portion 4a may have the same or a similar shape as the outer shape of the cylindrical portion 4b, for example.

Meanwhile, the other bearing 8 is arranged on the outer peripheral side of the end portion on the wheel/tire assembly W side (i.e., on the left side in FIG. 1) of the driving shaft 4. This end portion on the wheel/tire assembly W side of the driving shaft 4 is connected to the wheel/tire assembly W via a gear drive mechanism 9 such that power can be transmitted therebetween. In the example shown in FIG. 1, this gear drive mechanism 9 is a single pinion type planetary gear set that includes as rotating elements a sun gear 9s which is a gear with external teeth, a ring gear 9r which is a gear with internal teeth that is arranged concentric with respect to the sun gear 9s, and a carrier 9c which rotatably and revolvably supports pinion gears that are in mesh with both the sun gear 9s and the ring gear 9r.

The end portion on the wheel/tire assembly W side of the driving shaft 4 is connected to this gear drive mechanism 9, i.e., the planetary gear set 9. That is, the sun gear 9s of the planetary gear set 9 is integrally formed on the outer peripheral portion of the end portion on the wheel/tire assembly W side of the driving shaft 4, and the wheel, not shown, of the wheel/tire assembly W is connected to the carrier 9c of the planetary gear set 9. Meanwhile, the ring gear 9r of the planetary gear set 9 is connected to a fixed portion 6 inside the housing 2, for example, so as to be held against rotation. Therefore, with this planetary gear set 9, when the ring gear 9r is the reaction force element and the sun gear 9s is the input element, the carrier 9c becomes the output element, with the torque input to the sun gear 9s being increased (i.e., the rotation speed being reduced) and output from the carrier 9c. That is, this planetary gear set 9 functions as a reduction mechanism that increases the output torque of the motor 1 (i.e., reduces the rotation speed) that is transmitted to the driving shaft 4 via the pair of counter gears 5 and transmits it to the wheel/tire assembly W.

Here, this planetary gear set 9 employs helical gears that generate thrust in the axial direction when power is transmitted, just like the pair of counter gears 5 described above. The direction in which the teeth of the helical gears are slanted (i.e., the torsional direction) is set such that thrust is generated in the direction from the driving shaft 4 toward the wheel/tire assembly W side when power is transmitted between the driving shaft 4 and the wheel/tire assembly W. Therefore, when power is transmitted to the driving shaft 4, i.e., when the driving shaft 4 is rotated, force that acts to move the driving shaft 4 toward the wheel/tire assembly W side is applied to the end portion on the wheel/tire assembly W side of the driving shaft 4. Thus, if the driving shaft 4 is broken at a weak portion provided thereon, that force prevents the broken portions from interfering with each other, as will be described later.

As described above, the drive unit of the invention illustrated in FIG. 1 is able to directly transmit power from the in-wheel motor unit M to the wheel/tire assembly W. Therefore, external force input to the wheel/tire assembly W from an outer portion of the drive unit is also directly transmitted to the in-wheel motor unit M. That is, the drive unit of the invention is able to directly transmit power between the motor 1 of the in-wheel motor unit M, which is the driving power source, and the wheel/tire assembly W via a power transmitting path that is formed by the pair of counter gears 5, the driving shaft 4, and the planetary gear set 9 and the like.

Accordingly, as described above, it is possible that an unacceptably large external force may be directly transmitted from the wheel/tire assembly W side to the in-wheel motor unit M at times such as when the vehicle is traveling on a rough road with potholes, bumps, or obstacles or the like, and that excessively large external force may cause an abnormality in the gears of the planetary gear set 9 or the pair of counter gears 5 in the in-wheel motor unit M, for example. One way of dealing with an unacceptably excessive amount of external force, i.e., an unexpectedly large external force, is to increase the expected load when designing the various parts in the in-wheel motor unit M or set the safety margin considerably higher. However, in this case, the various components are made larger or of stronger material than they are when they are designed without taking an unexpectedly large force such as that described above into account. This may increase the size and weight, or manufacturing costs of the in-wheel motor unit M.

Thus, With the drive unit of the invention, a weak portion 4c that is less durable against external force on the wheel/tire assembly W than other portions in the power transmitting path is provided on the main body portion 4a of the driving shaft 4. Therefore, even in a case in which an unexpectedly or unacceptably large external force is input from the wheel/tire assembly W side, which would normally result in an abnormality occurring in the power transmitting path between the motor 1 and the wheel/tire assembly W, the effects of that excessive force on the parts in the in-wheel motor unit M can be mitigated without increasing the size and weight, or cost of the unit.

Figure 2:
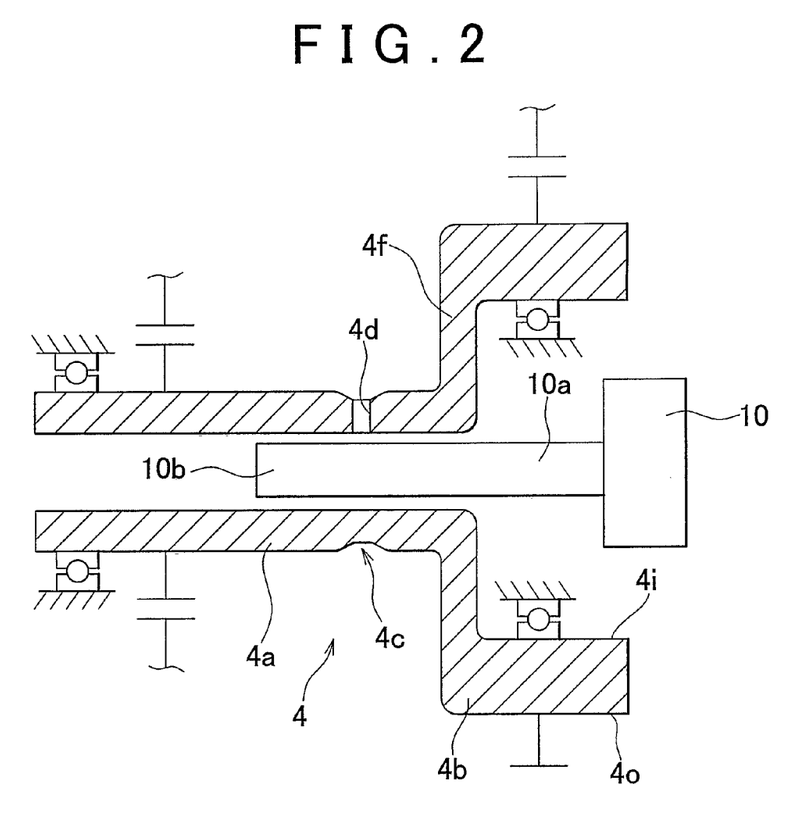
FIG. 2 is a diagram showing a frame format of an example structure of the weak portion in the drive unit according to the example embodiment of the invention.

More specifically, as shown in the enlarged view of FIG. 2, the weak portion 4c that is weaker than the other portions of the driving shaft 4 and less durable against external force applied to the wheel/tire assembly W than the constituent members in the power transmitting path between the motor 1 and the wheel/tire assembly W is provided at a predetermined portion in the axial direction on the main body portion 4a of the driving shaft 4. In the example shown in FIG. 2, the driving shaft 4 is such that the thickness of the weak portion 4c of the main body portion 4a of the driving shaft 4 which is the hollow shaft (i.e., the distance between the inner peripheral surface and the outer peripheral surface of the driving shaft 4) is thinner than the thickness of other portions of the main body portion 4a of the driving shaft 4. That is, the driving shaft 4 is such that the sectional area of the driving shaft 4 at the weak portion 4c, i.e., the sectional area of a section along a plane perpendicular to the axial direction of the driving shaft 4, is smaller than the sectional area at other portions of the driving shaft 4.

Furthermore, an oil passage 4d through which oil that is supplied to the oil pump 10, which will be described later, flows is formed at the weak portion 4c of the driving shaft 4. This oil passage 4d is, for example, a through-hole that extends from the outer peripheral surface to the inner peripheral surface of the weak portion 4c of the driving shaft 4, and is formed in one location in the weak portion 4c of the driving shaft 4 or in a plurality of locations in the circumferential direction of the weak portion 4c. Therefore, this oil passage 4d makes the portion where it is formed in the driving shaft 4 that much less durable (i.e., that much weaker) compared to the other portions along the power transmitting path. That is, the weak portion 4c of the invention is formed.

Figure 3:
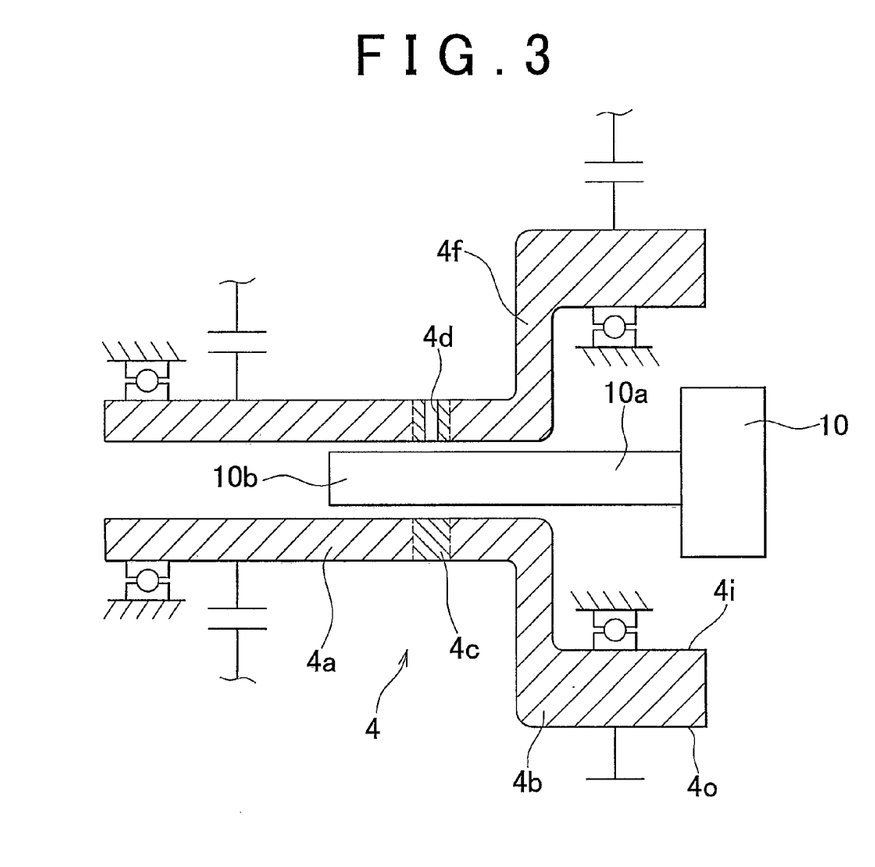
FIG. 3 is a diagram showing a frame format of another example structure of the weak portion in the drive unit according to the example embodiment of the invention.

FIG. 3 shows another example structure of this weak portion 4c. The weak portion 4c of the driving shaft 4 of the drive unit shown in FIG. 3 is formed of weaker material than the material of other portions of the driving shaft 4. For example, the weak portion 4c may be formed by making the material strength of the weak portion 4c weaker than the other portions of the driving shaft 4 by heat treating or surface treating the weak portion 4c under different conditions or using a different method, such as carburization or shot-peening, than is used with the other portions of the driving shaft 4.

In the example shown in FIG. 3, the shape of the weak portion 4c that is formed of different material is such that the outer peripheral surface and the inner peripheral surface of the main body portion 4a are uniform, i.e., the sectional area of the driving shaft 4 at the weak portion 4c is the same as the sectional area of other portions of the driving shaft 4. However, the weak portion 4c may also be formed by further reducing the strength of the material through heat treatment or surface treatment, for example, at a portion of the driving shaft 4 that is formed with a smaller sectional area than the sectional area of the other portions of the driving shaft 4, as shown in the example in FIG. 2 described above.

Here, the cylindrical portion 4b of the driving shaft 4, or the portion that connects the main body portion 4a to the cylindrical portion 4b, may be shaped and sized to be stronger than the main body portion 4a of the driving shaft 4. Also, the constituent members other than the driving shaft 4 in the power transmitting path between the motor 1 and the wheel/tire assembly W may be shaped and sized to be stronger than the main body portion 4a of the driving shaft 4. Therefore, the weak portion 4c formed on the driving shaft 4 is the portion that has the least strength in the power transmitting path between the motor 1 and the wheel/tire assembly W. Of course, the strength of this weak portion 4c is set to be equal to or greater than the necessary design strength of the drive unit.

The drive unit of the invention is provided with an oil pump 10 for supplying oil to the various drive portions in the drive unit and heat generating portions in the motor 1. This oil pump 10 is driven by output torque of the motor 1, which is the driving power source, so as to generate hydraulic pressure. This oil pump 10 is designed to drive the rotating shaft 10a using the power from the motor 1 to draw oil up through an inlet, not shown, and discharge that oil from an outlet, also not shown. This oil pump 10 may be a well-known pump of any of a variety of structures, such as a rotating pump, e.g., a gear pump, a trochoid pump, a vane pump, or a screw pump, or a piston pump or the like. This oil pump 10 draws up oil stored in an oil sump 11 formed in the bottom portion in the housing 2 and discharges, i.e., supplies, it to portions that need to be lubricated or cooled by oil, such as the rotor or coil end, neither of which are shown, of the motor, or the bearings that support the rotating members in the drive unit, or transmitting members such as gears that transmit power between the rotating members, for example.

The rotating shaft 10a of the oil pump 10 is inserted into the hollow portion in the main body portion 4a of the driving shaft 4. The rotating shaft 10a of the oil pump 10 and the main body portion 4a of the driving shaft 4 are engaged such that the they rotate together as a single unit, along the portion on the motor 1 side from the position where the weak portion 4c in the axial direction of the driving shaft 4 is formed on the main body portion 4a of the driving shaft 4. For example, the rotating shaft 10*a* of the oil pump 10 and the main body portion 4*a* of the driving shaft 4 may be engaged along the portion on the motor 1 side from where the weak portion 4*c* in the axial direction of the driving shaft 4 is formed on the main body portion 4*a* of the driving shaft 4, such that rotating shaft 10*a* rotates together with the main body portion 4*a*. This engagement may be achieved by splines or a key groove and key formed on the outer peripheral portion of the rotating shaft 10*a* and the inner peripheral portion of the main body portion 4*a*, for example.

In this way, rotating shaft 10*a* of the oil pump 10 is engaged with the portion of the driving shaft 4 that is on the motor 1 side of the weak portion 4*c*, such that the rotating shaft 10*a* is able to rotate together with that portion of the driving shaft 4. Therefore, even if the driving shaft 4 breaks at the weak portion 4*c*, the oil pump 10 can still be driven by having the rotating shaft 10*a* rotate together with the portion of that broken driving shaft 4 that is on the motor 1 side of the weak portion 4*c*.

The tip end of the rotating shaft 10*a* of the oil pump 10, i.e., the tip end 10*b* of the rotating shaft 10*a* on the side that is inserted into the hollow portion of the driving shaft 4 (i.e., the left side in FIGS. 1 and 2) is inserted to a portion of the driving shaft 4 that is on the wheel/tire assembly W side of where the weak portion 4*c* in the axial direction of the driving shaft 4 is formed, i.e., beyond where the weakest point 4*c* in the axial direction of the driving shaft 4 is formed. That is, the rotating shaft 10*a* of the oil pump 10 is shaped and sized such that when it is inserted into the hollow portion of the driving shaft 4, the tip end portion 10*b* of the rotating shaft 10*a* is closer to the wheel/tire assembly W than the weak portion 4*c* of the driving shaft 4 is in the axial direction of the driving shaft 4.

Therefore, if the driving shaft 4 breaks at the weak portion 4*c*, both the portion of the driving shaft 4 that is on the wheel/tire assembly W side of the weak portion 4*c* and the portion of the driving shaft 4 that is on the motor 1 side of the weak portion 4*c* are supported by the end portion of the rotating shaft 10*a* of the oil pump 10. Therefore, the rotational state and the supported state of the portion of the driving shaft 4 on the wheel/tire assembly W side of the weak portion 4*c*, i.e., the wheel/tire assembly W, can be maintained while the driving shaft 4 is broken at the weak portion 4*c*. That is, the wheel/tire assembly W is able to rotate idly if the driving shaft 4 is broken at the weak portion 4*c*.

Incidentally, when the rotating shaft 10*a* is inserted in the hollow portion of the driving shaft 4, the outer peripheral surface of the rotating shaft 10*a* of the portion on the wheel/tire assembly W side of the weak portion 4*c* in the axial direction of the driving shaft 4 is preferably covered with a coating or the like or surface-treated to reduce the friction coefficient. As a result, if the driving shaft 4 breaks at the weak portion 4*c* and the inner peripheral surface of that broken portion is supported by the outer peripheral surface of the rotating shaft 10*a*, friction between the inner peripheral surface of that broken portion and the outer peripheral surface of the rotating shaft 10*a* can be reduced, thereby preventing or inhibiting seizing or the like.

Also, a flow passage, not shown, for oil to be discharged from the oil pump 10 is formed inside the rotating shaft 10*a* of the oil pump 10. Oil is discharged and supplied from the tip end portion 10*b* of the rotating shaft 10*a*, as well as from a location that corresponds to the oil passage 4*d* formed in the weak portion 4*c* of the driving shaft 4 described above while the rotating shaft 10*a* is inserted in the hollow portion of the driving shaft 4. Therefore, if the rotating shaft 10*a* breaks at the weak portion 4*c* and the inner peripheral portion of that broken portion is supported by the outer peripheral surface of the rotating shaft 10*a*, that broken portion can be forcibly lubricated and cooled by the oil supplied from the oil pump 10, such that seizing or the like at that broken portion can be prevented or inhibited.

An electronic control unit (ECU) 12 is provided to control this drive unit, i.e., to control the rotation of the motor 1. The motor 1 is connected to this ECU 12 so that it can receive control signals from the ECU 12.

Various sensors for controlling the drive unit are also connected to the ECU 12, and the ECU 12 receives signals from these sensors. Specific examples of these sensors include a wheel speed sensor 13 which is provided for each wheel/tire assembly W and detects the rotation speed of the corresponding wheel/tire assembly W, i.e., the rotation speed of the carrier 9*c* of the planetary gear set 9, a temperature sensor 14 which is provided at the weak portion 4*c* of the driving shaft 4 and detects the temperature of that weak portion 4*c*, and the resolver 3 of the motor 1 described above.

Accordingly, the ECU 12 is able to detect the rotation angle of the output shaft 1*a* of the motor 1, the rotation speed of the output shaft 1*a* of the motor 1, the rotation speed of each wheel/tire assembly W (i.e., the wheel speed), and the temperature of the weak portion 4*c* of the driving shaft 4 and the like. Meanwhile, the ECU 12 outputs signals to control the operation of each motor 1 via an inverter, not shown, and the like, for example.

Figure 4:
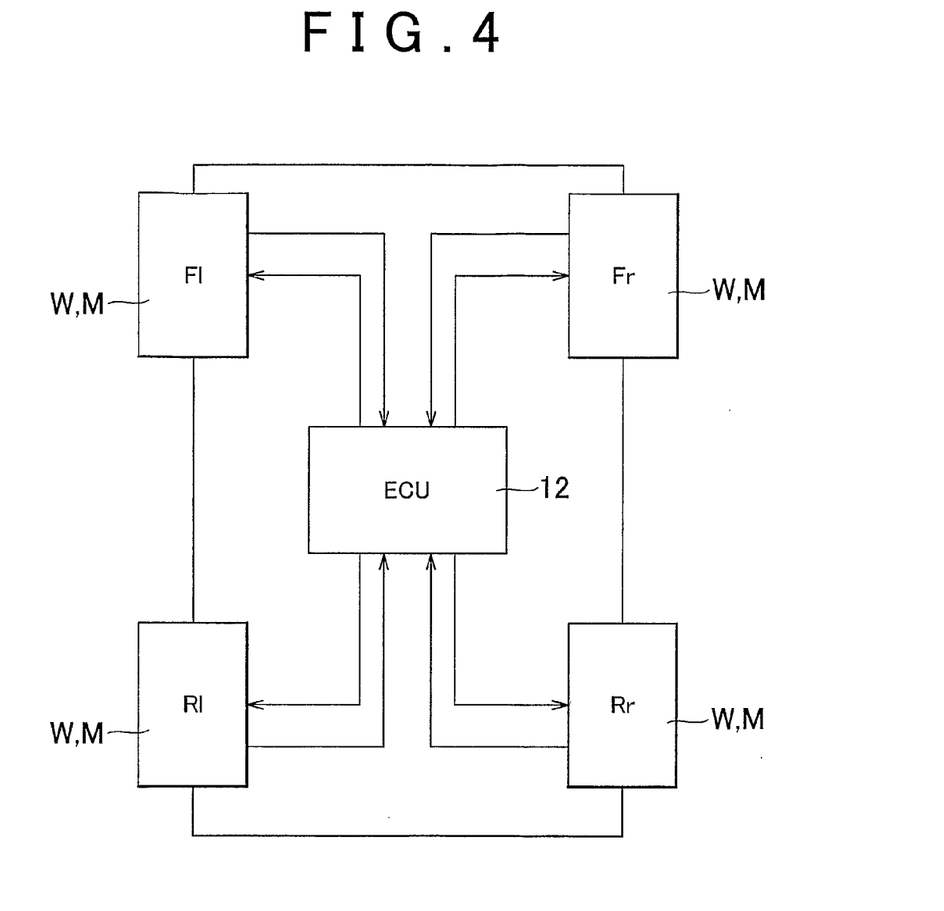
FIG. 4 is a diagram showing a frame format of the drive unit according to the example embodiment of the invention when mounted in a vehicle with four wheels.

Next, an example of failsafe control for the drive unit of the invention having the structure described above, or more specifically, control for determining whether there is a failure in the drive unit (i.e., failure determining control), will be described. Incidentally, when the drive unit of the invention is applied to a vehicle having four wheels, the drive unit of the invention in which an in-wheel motor unit M is housed in the wheel/tire assembly W may be provided for all four wheels of the vehicle. Alternatively, although not shown, the drive unit of the invention may be provided for only the left and right front wheels, or only the left and right rear wheels, and the wheels for which it is not provided may be driven by another power source such as an internal combustion engine. Here, the drive unit of the invention is applied to a vehicle having four wheels, as shown in FIG. 4, so an example of control for a structure in which the drive unit of the invention is provided for all of the four wheels will be described.

Figure 5A:
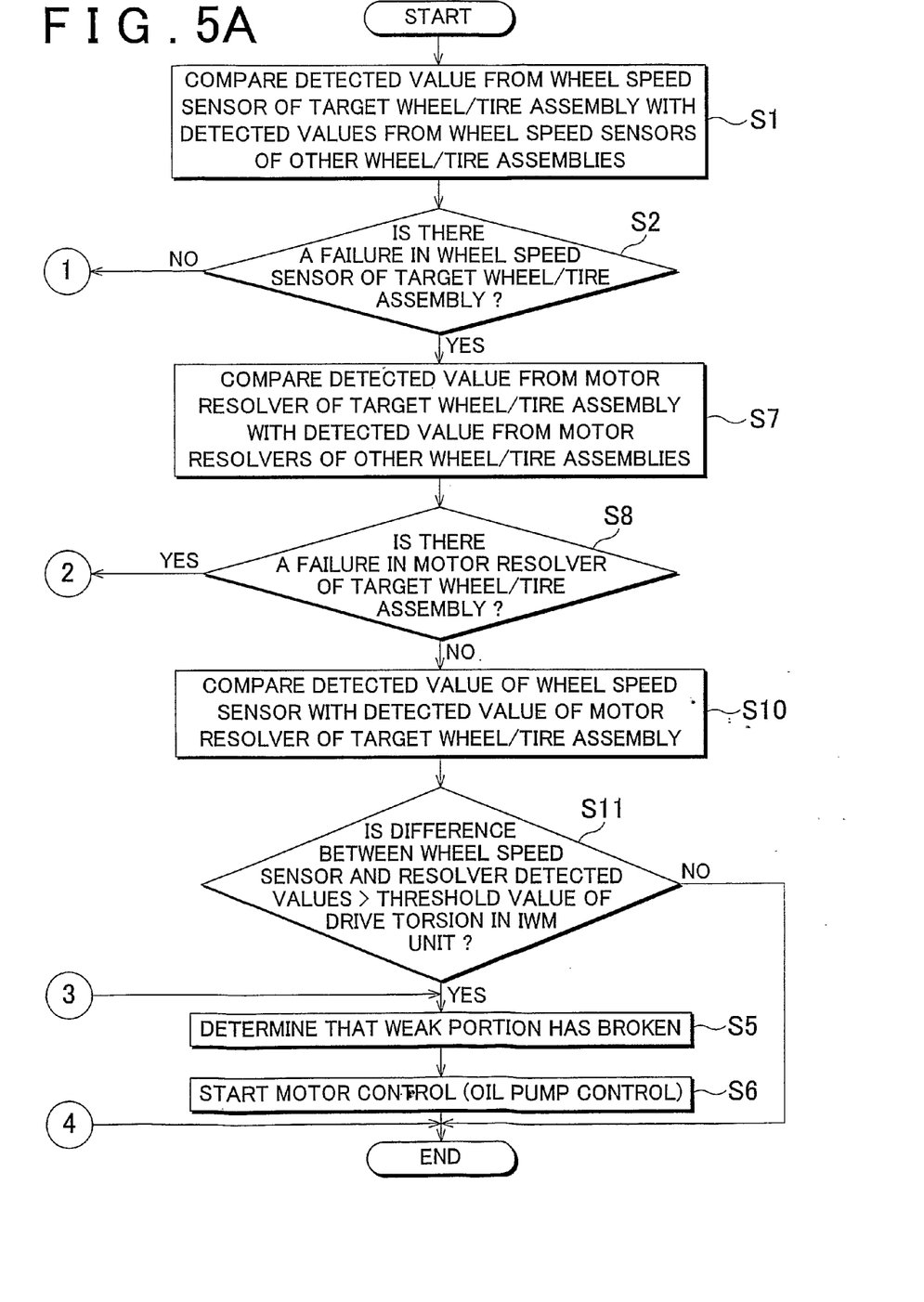
FIGS. 5A and 5B is a flowchart illustrating an example of control executed by a control apparatus according to the example embodiment of the invention.
Figure 5B:
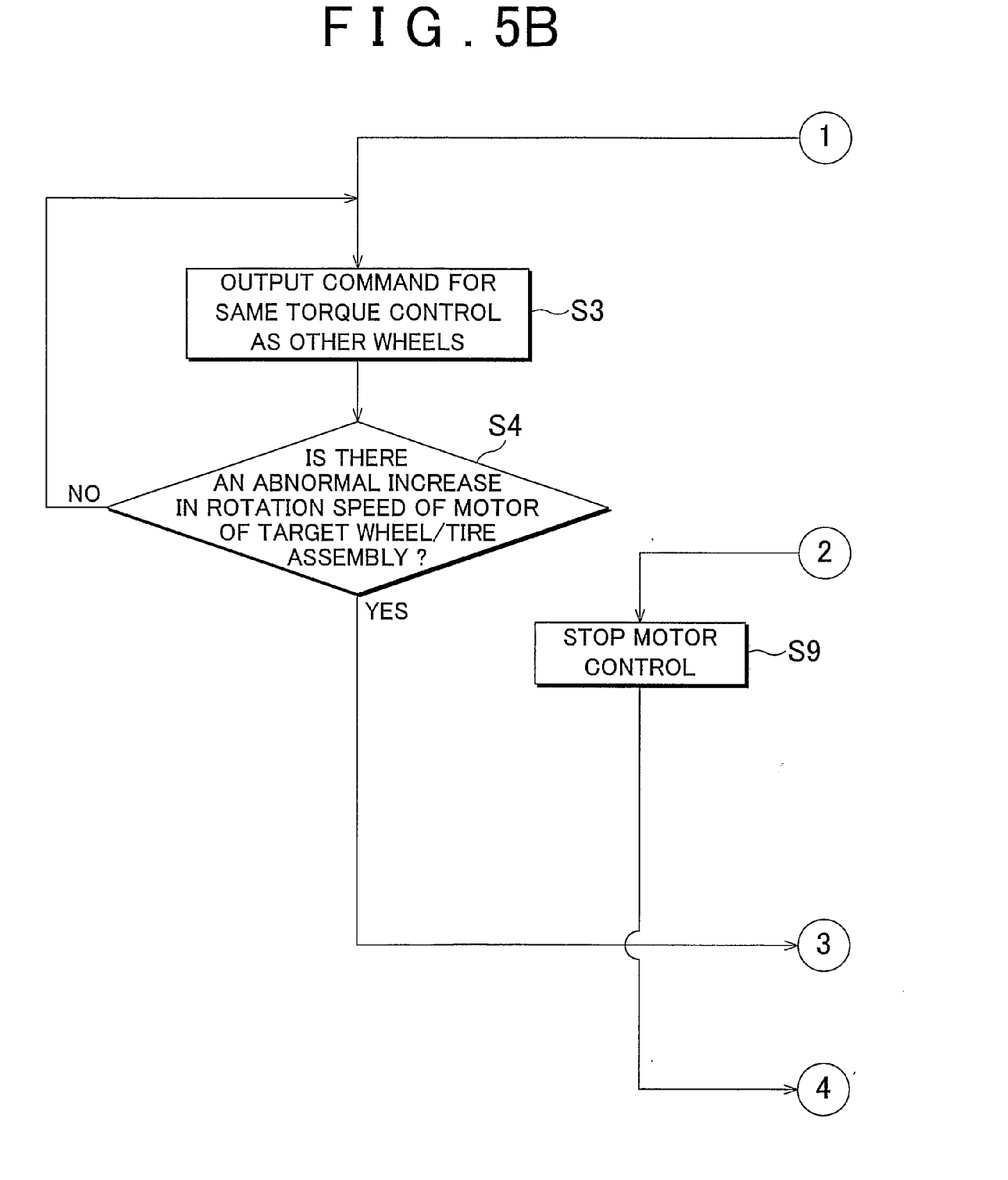

FIG. 5 is a flowchart illustrating one example of that control. The routine shown in this flowchart is repeatedly executed at predetermined short intervals of time. In FIG. 5, first the rotation speed of each wheel/tire assembly W is detected and the detected value of a given wheel/tire assembly W (hereinafter referred to as the "target wheel/tire assembly W") is compared with the detected values of the other wheel/tire assemblies W (hereinafter simply referred to as "other wheel/tire assemblies W") (step S1). The rotation speeds of the wheel/tire assemblies W can be detected by the wheel speed sensor 13 provided for each wheel/tire assembly W.

Next, it is determined from a comparison of the detected values of the rotation speeds of the wheel/tire assemblies W whether there is some sort of abnormality in the wheel speed sensor 13 of the target wheel/tire assembly W, i.e., whether a failure has occurred in the wheel speed sensor 13 of the target wheel/tire assembly W (step S2). For example, if the vehicle is traveling in a straight line at a predetermined speed, the rotation speed of all four wheel/tire assemblies W will be substantially the same. If at this time the detected value of the rotation speed of the target wheel/tire assembly W is different than the detected values of the rotation speeds of the three other wheel/tire assemblies W, it is determined that there is a failure in the vehicle speed sensor 13 of the target wheel/tire assembly W.

If, on the other hand, the detected values of the rotation speeds of all of the wheel/tire assemblies W are the same, for example, it is determined that there is not a failure in the wheel speed sensor 13 of the target wheel/tire assembly W. In this case, the determination in step S2 is no so the process proceeds on to step S3 where the target wheel/tire assembly W is controlled in the same manner as the three other wheel/tire assemblies W. For example, the same torque control command that is output to the three other wheel/tire assemblies W is also output to the target wheel/tire assembly W.

While the rotation control of the wheel/tire assemblies W is being executed in this way, the rotation speed of the motor 1 provided in the target wheel/tire assembly W is detected constantly or periodically and monitored (step S4). The rotation speed of the motor 1 is able to be obtained from the detected value of the resolver 3 provided with the motor 1, as described above. Also, an abnormal increase in the rotation speed of the motor 1 is detected when the rotation speed of the motor 1 with respect to the rotation speed of the wheel/tire assembly W increases beyond a predetermined value that has been set as a threshold value. In other words, if the difference between the rotation speed of the wheel/tire assembly W and the rotation speed of the motor 1 becomes greater than a predetermined value, it is determined that the rotation speed of the motor 1 has increased abnormally.

If an abnormality is not recognized in the detected value of the rotation speed of the motor 1 of the target wheel/tire assembly W, the determination in step S4 is no so the process returns to step S3 and the previous control is repeated. That is, the control in steps S3 and S4 is repeatedly executed unless an abnormality is recognized in the detected value of the rotation speed of the motor 1 of the target wheel/tire assembly W such that the determination in step S4 is yes.

If, on the other hand, the rotation speed of the motor 1 provided for the target wheel/tire assembly W with respect to that target wheel/tire assembly W increases beyond the predetermined value that has been set as the threshold value, the determination in step S4 is yes. In other words, if the difference between the rotation speed of the target wheel/tire assembly W and the rotation speed of the motor provided for that wheel/tire assembly W exceeds the set threshold value which serves as a determination reference, the determination in step S4 is yes, so the process proceeds on to step S5 where it is determined that the weak portion 4c of the driving shaft 4 of the in-wheel motor unit M of the target wheel/tire assembly W is broken. That is, it is determined that for some reason an unacceptably large external force has been input from the target wheel/tire assembly W side to the in-wheel motor unit M, causing the weak portion 4c of the driving shaft 4, which is designed to have the lowest durability of any point within the power transmitting path of the in-wheel motor unit M as described above, to break, thus resulting in a deviation between the value of the rotation speed of the target wheel/tire assembly W and the value of the rotation speed of the motor 1.

If it is determined that the weak portion 4c of the driving shaft 4 has broken, control of the motor 1 in response to that broken weak portion 4c, or more specifically, drive control of the oil pump 10 by the motor 1, is executed (step S6). That is, if the weak portion 4c of the driving shaft 4 breaks, the drive state of the oil pump 10 is appropriately controlled to prevent the rotating and sliding portion of the broken portion from seizing, as well as to lubricate and cool the rotating members, such as the bearing 8 and the planetary gear set 9, on the target wheel/tire assembly W side that continue to rotate even after the weak portion 4c has broken. Therefore, even if the weak portion 4c of the driving shaft 4 breaks, the oil pump 10 continues to be driven to appropriately supply oil to the portions that need it. As a result, the rotating and sliding portion can be prevented or inhibited from seizing and the rotating members can be prevented or inhibited from wearing and overheating. Then this cycle of the routine ends.

If, for example, the detected value of the rotation speed of the target wheel/tire assembly W differs greatly from the detected values of the rotation speeds of the three other wheel/tire assemblies W, it is determined that a failure has occurred in the wheel speed sensor 13 of the target wheel/tire assembly W, in which case the determination in step S2 is yes. In this case, the process proceeds on to step S7 where the rotation angle of the motor 1 (or more specifically, the rotation angle of the rotor shaft 1a of the motor 1) of each wheel/tire assembly W is detected for each wheel/tire assembly W, and the detected value of the rotation angle of the motor 1 of the target wheel/tire assembly W is compared with the detected values of the rotation angles of the motors 1 of the three other wheels. The rotation angles of the motors 1 can be detected using the resolver 3 provided with each motor 1 of each wheel/tire assembly W as described above.

Next, it is determined from a comparison of the detected values of the rotation angles of the wheel/tire assemblies W whether there is some sort of abnormality in the resolver 3 of the target wheel/tire assembly W, i.e., whether a failure has occurred in the resolver 3 of the target wheel/tire assembly W (step S8). For example, if the vehicle is traveling in a straight line at a predetermined speed, the rotation angles of the motors 1 of the wheel/tire assemblies W of the four wheels will be substantially the same, just as with the failure determining control of the wheel speed sensor 13 described above. If at this time the detected value of the rotation angle of the target wheel/tire assembly W is different than the detected values of the rotation angles of the motors 1 of the three other wheel/tire assemblies W, it is determined that there is a failure in the resolver 3 of the motor 1 of the target wheel/tire assembly W.

If, for example, the detected value of the rotation angle of the target wheel/tire assembly W greatly differs from the detected values of the rotation angles of the motors 1 of the three other wheel/tire assemblies W, it is determined that a failure has occurred in the resolver 3 of the motor 1 of the target wheel/tire assembly W, in which case the determination in step S8 is yes. In this case, the process proceeds on to step S9 where the rotation control of the motor 1 of the target wheel/tire assembly W is discontinued, after which this cycle of the routine ends. That is, if a failure has occurred in the resolver 3 of a motor 1, that motor 1 is unable to be appropriately controlled so the control of that motor 1 is immediately discontinued.

If, on the other hand, the detected values of the rotation angles of the motors 1 of the wheel/tire assemblies W are all the same, for example, it is determined that a failure has not occurred in the resolver 3 of the motor 1 of the target wheel/tire assembly W. In this case, the determination in step S8 is no so the process proceeds on to step S10 where the detected value of that resolver 3 is compared with the detected value from the wheel speed sensor 13.

Then it is determined whether the difference between the detected value from the resolver 3 of the motor 1 and the detected value from the wheel speed sensor 13 of the target wheel/tire assembly W is greater than a threshold value of drive torsion in the in-wheel motor unit M (step S11). The difference between the detected value from the resolver 3 of the motor 1 and the detected value from the wheel speed sensor 13 of the target wheel/tire assembly W is specifically the difference between the rotation angle of the target wheel/tire assembly W obtained based on the rotation speed of the target wheel/tire assembly W detected, by the wheel speed sensor 13 and the rotation angle of the motor 1 detected by the resolver 3 of the motor 1 provided in that target wheel/tire assembly W. Also, the drive torsion in the in-wheel motor unit M is the torsion that is inevitably generated by the effects of shaft torsion and gear backlash and the like in the power transmitting path from the motor 1 to the wheel/tire assembly W when the wheel/tire assembly W is driven by output torque from the motor 1 ordinarily, i.e., when the weak portion 4c of the driving shaft 4 is not broken. The amount of drive torsion can be expressed as the difference between the rotation angle of the motor 1 in that state and the rotation angle of the wheel/tire assembly W. The threshold value of the drive torsion is, for example, the theoretical maximum value of torsion that is inevitably generated ordinarily, and is a predetermined value set as a threshold value for determining whether the amount of drive torsion generated in the in-wheel motor unit M is an amount that is inevitably generated ordinarily or an abnormal amount that exceeds the range of torsion that is inevitably generated ordinarily.

If the difference between the detected value from the resolver 3 of the motor 1 and the detected value from the wheel speed sensor 13 of the target wheel/tire assembly W is equal to or less than the threshold value of the drive torsion in the in-wheel motor unit M, the determination in step S11 is no. In this case, it is determined that a failure has not occurred, e.g., that the weak portion 4c of the driving shaft 4 has not broken, in the in-wheel motor unit M at that point, so this cycle of the routine ends without executing the subsequent control.

If, on the other hand, the difference between the detected value from the resolver 3 of the motor 1 and the detected value from the wheel speed sensor 13 of the target wheel/tire assembly W is greater than the threshold value of the drive torsion in the in-wheel motor unit M, the determination in step S11 is yes. In this case, the process proceeds on to step S5 where it is determined that the weak portion 4c of the driving shaft 4 in the in-wheel motor unit M of the target wheel/tire assembly W has broken. That is, it is determined that for some reason an unacceptably large external force has been input to the in-wheel motor unit M from the target wheel/tire assembly W side, causing the weak portion 4c of the driving shaft 4, which is designed to have the lowest durability of any point within the power transmitting path of the in-wheel motor unit M as described above, to break, thus resulting in a deviation between the value of the rotation angle of the target wheel/tire assembly W and the value of the rotation angle of the motor 1.

If it is determined that the weak portion 4c of the driving shaft 4 has broken, the process proceeds on to step S6 where control of the motor 1 in response to that broken weak portion 4c, or more specifically, drive control of the oil pump 10 by the motor 1, is executed, as described above. Then this cycle of the routine ends.

Figure 6:
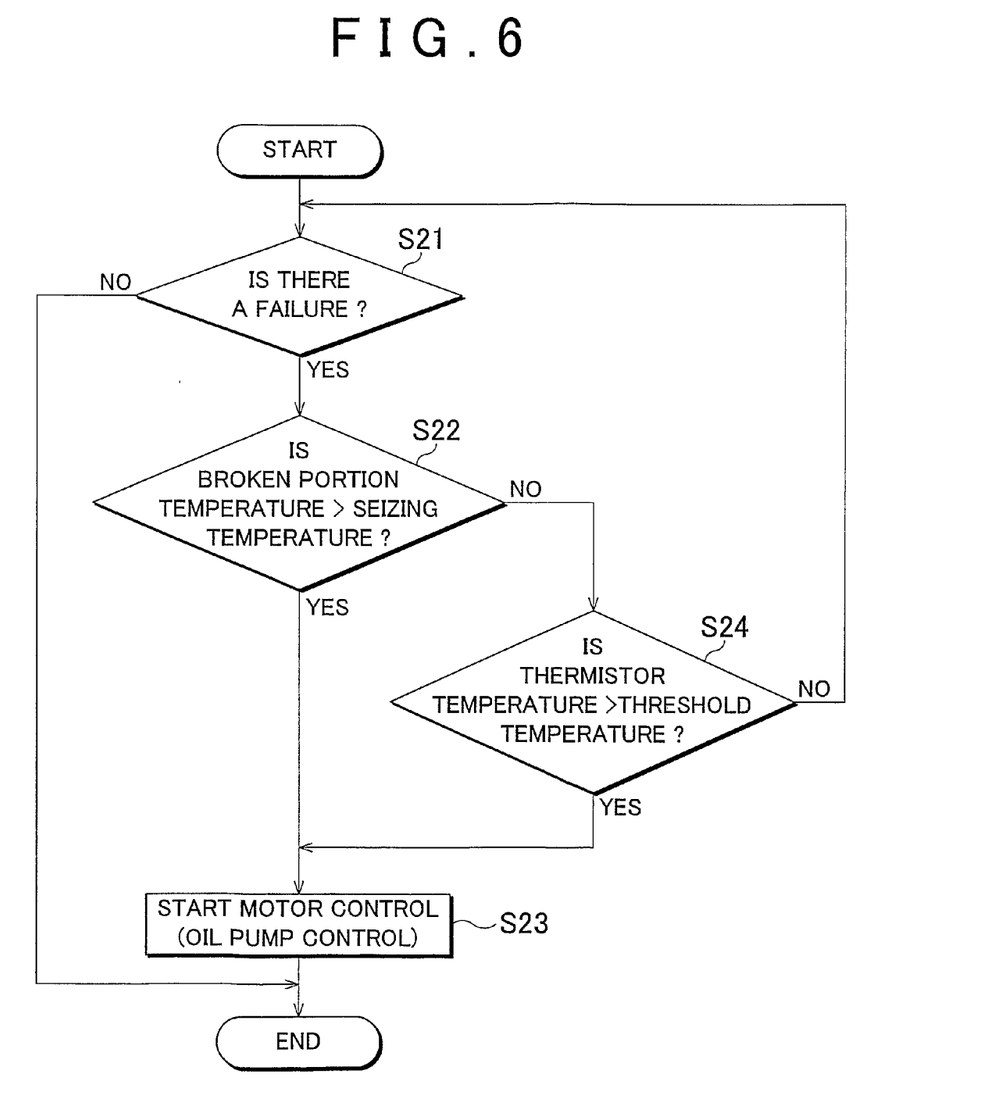
FIG. 6 is a flowchart illustrating another example of control executed by the control apparatus according to the example embodiment of the invention.

Next, an example of control of the oil pump 10 by the motor 1 when a failure has occurred, such as when the weak portion 4c of the driving shaft 4 has broken, for example, (i.e., oil pump control during a failure) will be described as another example of control for the drive unit of the invention with reference to the flowchart in FIG. 6. The routine in the flowchart in FIG. 6 is repeatedly executed at predetermined short intervals of time. In FIG. 6, first it is determined whether a failure in which the weak portion 4c of the driving shaft 4 has broken has occurred (step S21). This determination may be made based on the results of the failure determining control shown in the flowchart in FIG. 5 described above.

If a failure in which the weak portion 4c of the driving shaft 4 breaks has not occurred, the determination in step S21 is no. In this case, it is not necessary to perform the oil pump control during a failure so this cycle of the routine ends without the subsequent control being executed.

If, on the other hand, a failure in which the weak portion 4c of the driving shaft 4 has broken has occurred, the determination in step S21 is yes. In this case, the process proceeds on to step S22 where the temperature Tb of the broken portion of the weak portion 4c of the driving shaft 4 (hereinafter simply referred to as the "broken portion temperature Tb") is detected by the temperature sensor 14, and it is determined whether this broken portion temperature Tb is higher than a seizing temperature Ts. In this case, the seizing temperature Ts is a predetermined temperature that is set as the temperature at which seizing will or may occur when the weak portion 4c of the driving shaft 4 has broken and the broken portions rotate relative to one another while sliding. This seizing temperature Ts is also a predetermined value that has been set as a threshold value for determining whether seizing may occur at those broken portions.

If the broken portion temperature Tb is higher than the seizing temperature Ts, the determination in step S22 is yes. In this case, the process proceeds on to step S23 where control of the motor 1 in response to that broken weak portion 4c, or more specifically, drive control of the oil pump 10 by the motor 1, is executed. That is, if the broken portion temperature Tb is higher than the seizing temperature Ts, seizing may occur at the broken portion of the weak portion 4c. Therefore, in order to prevent seizing, the motor 1 is driven to appropriately drive the oil pump 10, thereby forcibly supplying oil to that broken portion. Then this cycle of the routine ends.

If, on the other hand, the broken portion temperature Tb is equal to or less than then seizing temperature Ts, the determination in step S22 is no. In this case, the process proceeds on to step S24 where it is determined whether the temperature Tm of a heat generating portion (such as a coil end) of the motor 1 detected by a thermistor or the like provided with the motor 1 (hereinafter this temperature will be referred to as the "thermistor temperature Tm") is higher than a threshold temperature Ta. In this case, the threshold temperature Ta is, for example, a lower limit value of a temperature that causes problems for rotation control of the motor 1 when the temperature of a heat generating portion of the motor 1 has become high. This threshold temperature Ta is also a predetermined value that is set as a threshold value for determining the need to cool the motor 1 more than it is cooled ordinarily, by increasing the amount of oil that is forcibly supplied to the motor 1 beyond the amount of oil that is ordinarily supplied to cool the motor 1.

If the thermistor temperature Tm is equal to or less than the threshold temperature Ta, the determination in step S24 is no, in which case the process returns to step S21 and the previous control is repeated. If, on the other hand, the thermistor temperature Tm is higher than the threshold temperature Ta, the determination in step S24 is yes. In this case, the process proceeds on to step S23 described above where control of the motor 1 in response to the high temperature of the motor 1, or more specifically, drive control of the oil pump 10 by the motor 1, is executed. That is, if the thermistor temperature Tm is higher than the threshold temperature Ta, the heat generating portion of the motor 1 needs to be cooled even more so the motor 1 is driven to appropriately drive the oil pump 10 such that oil is forcibly supplied to the heat generating portion of the motor 1. Then this cycle of the routine ends.

Accordingly, with the drive unit of the invention and the control apparatus thereof, the weak portion 4c which is weaker than the other portions with respect to external force applied to the wheel/tire assembly W is provided at a portion of the driving shaft 4 in the power transmitting path between the wheel/tire assembly W and the motor 1 which is the driving power source. Also, the oil pump 10 which can be driven even if that weak portion 4c breaks is provided. As a result, if an unexpectedly large external force is applied to the wheel/tire assembly W while the vehicle is traveling, for example, the weak portion 4c of the driving shaft 4 will break first in the power transmitting path between the wheel/tire assembly W and the motor 1. That is, the effects of external force on the other portions in the power transmitting path can be eliminated or minimized by having only the weak portion 4c of the driving shaft 4 break. Also, even if the weak portion 4c of the driving shaft 4 breaks in this way, the oil pump 10 can still be driven. That is, a so-called failsafe function can be established against excessive force being input from the wheel/tire assembly W side.

With the drive unit having this failsafe function as the target of control, it is determined whether there is an abnormality in the drive unit from the detected values of various sensors such as the resolver 3 of the motor 1, the wheel speed sensor 13 of the wheel/tire assembly W, and the temperature sensor 14 for monitoring the temperature of the weak portion 4c, for example. If an abnormality is detected, operation of the motor 1 is appropriately controlled according to that abnormality. Therefore, when an unexpectedly large external force is applied to the wheel/tire assembly W and the weak portion 4c of the driving shaft 4 breaks, such that oil needs to be supplied by the oil pump 10, the operation of the motor 1 is controlled to appropriately control the driving state of the oil pump 10 such that oil can be appropriately supplied to those places where it is needed.

Incidentally, the invention is not limited to the detailed example embodiment described above. For example, in the detailed example embodiment, the drive unit of the invention is applied to an in-wheel motor of a vehicle, but it is not limited to an in-wheel motor. That is, the invention may also be applied to a drive unit in which a motor-generator or the like which serves as the driving power source is provided via a drive shaft or a speed change mechanism or the like for each wheel/tire assembly.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A drive unit which forms a power transmitting path that includes a driving shaft between a wheel/tire assembly and a driving power source provided separately for each wheel/tire assembly, and which transmits power via the driving shaft, the drive unit comprising:
   a weak portion that is less durable than any other portion in the power transmitting path with respect to external force applied to the wheel/tire assembly is formed on the driving shaft; and
   a mechanism which generates force in opposite directions, which acts to move a portion of the driving shaft that is on the driving power source side of the weak portion and a portion of the driving shaft that is on the wheel/tire assembly side of the weak portion away from each another.

2. The drive unit according to claim 1, wherein the weak portion is made less durable by making the sectional area of the driving shaft smaller than the sectional area at any other portion of the driving shaft.

3. The drive unit according to claim 1, wherein the weak portion is made less durable by providing an oil passage through which oil flows.

4. The drive unit according to claim 1, wherein the weak portion is made less durable by making the material weaker than the material of any other portion of the driving shaft.

5. The drive unit according to claim 1, wherein the mechanism includes a gear drive mechanism that uses a helical gear which generates thrust in the opposite directions when power is transmitted between the driving shaft and the driving power source, and between the driving shaft and the wheel/tire assembly.

6. The drive unit according to claim 5, wherein an end portion on the driving power source side of the driving shaft is formed in a cylindrical shape having an outer peripheral portion and an inner peripheral portion; the gear drive mechanism is provided on the outer peripheral portion; and a bearing that rotatably supports the driving shaft is provided on the inner peripheral portion.

7. The drive unit according to claim 1, wherein at least a portion of the driving shaft is hollow; and a rotating shaft of an oil pump is inserted in the hollow portion of the driving shaft in such a manner that the rotating shaft is able to rotate together with the driving shaft.

8. The drive unit according to claim 7, wherein the rotating shaft is engaged with a portion of the driving shaft that is on the driving power source side of the weak portion such that the rotating shaft is able to rotate together with that portion of the driving shaft.

9. The drive unit according to claim 7, wherein the rotating shaft is inserted up to an inner peripheral portion of the driving shaft that is on the wheel/tire assembly side of the weak portion.

10. The drive unit according to claim 9, wherein the outer peripheral surface of the rotating shaft is surface treated to reduce the friction coefficient.

11. The drive unit according to claim 7, wherein the driving power source is able to drive the oil pump when the driving shaft is broken at the weak portion.

12. The drive unit according to claim 1, wherein the driving power source includes an in-wheel motor housed in a wheel of the wheel/tire assembly.

13. A control apparatus of a drive unit which forms a power transmitting path that includes a driving shaft between a wheel/tire assembly and an electric motor provided separately for each wheel/tire assembly, and which transmits power via the driving shaft, wherein a weak portion that is less durable than any other portion in the power transmitting path with respect to external force applied to the wheel/tire assembly is formed on the driving shaft; the drive unit has an oil pump that can be driven by output torque from the electric motor when the driving shaft is broken at the weak portion said control apparatus comprising:
   a sensor that detects an operating state of the drive unit, an abnormality detecting portion that detects an abnormality in various portions relating to the drive unit based on a detected value of the sensor;
   an electric motor controlling portion that controls the electric motor based on the abnormality detected by the abnormality detecting portion, wherein the sensor includes a wheel speed sensor that detects the rotation speed of the wheel/tire assembly and a rotation speed sensor that detects the rotation speed of the electric motor; and the abnormality detecting portion includes a first break determining portion which determines that the weak portion is broken when it is determined that there is no abnormality in the wheel speed sensor based on a detected value of the wheel speed sensor, and the difference between the rotation speed of the wheel/tire assembly detected by the wheel speed sensor and the rotation speed of the electric motor detected by the rotation speed sensor of the electric motor provided for the wheel/tire assembly exceeds a threshold value that has been set as a determination reference.

14. The control apparatus according to claim 13, wherein the sensor includes a wheel speed sensor that detects the rotation speed of the wheel/tire assembly, a rotation speed sensor that detects the rotation speed of the electric motor and a rotation angle sensor that detects the rotation angle of the electric motor; and the abnormality detecting portion includes a second break determining portion which determines that the weak portion is broken when it is determined that there is an abnormality in the wheel speed sensor based on a detected value of the wheel speed sensor, and the difference between the rotation angle of the wheel/tire assembly detected by the wheel speed sensor and the rotation angle of the electric motor detected by the rotation angle sensor of the electric motor provided for the wheel/tire assembly exceeds a threshold value that has been set as a determination reference.

15. The control apparatus according to claim 13, wherein the sensor also includes a rotation angle sensor that detects the rotation angle of the electric motor; and the abnormality detecting portion includes a second break determining portion which determines that the weak portion is broken when it is determined that there is an abnormality in the wheel speed sensor based on a detected value of the wheel speed sensor, and the difference between the rotation angle of the wheel/tire assembly detected by the wheel speed sensor and the rotation angle of the electric motor detected by the rotation angle sensor of the electric motor provided for the wheel/tire assembly exceeds a threshold value that has been set as a determination reference.

16. The control apparatus according to claim 13, wherein the sensor also includes a temperature sensor that detects the temperature of an oil receiving portion to which oil is supplied by the oil pump; and the electric motor controlling portion includes a pump driving portion which drives the oil pump by controlling the electric motor when it is determined by the abnormality detecting portion that the weak portion is broken, and the temperature detected by the temperature sensor exceeds a threshold value that has been set as a determination reference that requires oil be supplied to the oil receiving portion.

17. The control apparatus according to claim 13, wherein the electric motor includes an in-wheel motor housed in a wheel of the wheel/tire assembly.

\* \* \* \* \*